United States Patent [19]

Ide

[11] Patent Number: 4,714,343

[45] Date of Patent: * Dec. 22, 1987

[54] OPTICAL FIBER CHARACTERISTIC MEASUREMENT

[75] Inventor: Takashi Ide, Yokohama, Japan

[73] Assignee: Sumitomo Electric Industries, Ltd., Osaka, Japan

[*] Notice: The portion of the term of this patent subsequent to Jan. 13, 2004 has been disclaimed.

[21] Appl. No.: 848,229

[22] Filed: Apr. 4, 1986

[30] Foreign Application Priority Data

Apr. 15, 1985 [JP] Japan .................................. 60-80003

[51] Int. Cl.$^4$ ........................................... G01N 21/84
[52] U.S. Cl. .................................................. 356/73.1
[58] Field of Search ....................................... 356/73.1

[56] References Cited

U.S. PATENT DOCUMENTS 4,636,070 1/1987 Ide ........................................ 356/73.1

FOREIGN PATENT DOCUMENTS 54-35758 3/1979 Japan .................................. 356/73.1
60-85351 5/1985 Japan .................................. 356/73.1

Primary Examiner—Vincent P. McGraw
Attorney, Agent, or Firm—Cushman, Darby & Cushman

[57] ABSTRACT

An optical fiber characteristic measuring device for automatically measuring, at successive measuring stages, various characteristics of optical fiber samples. Each measuring stage has optical system incident and emergent ends. An optical fiber sample is set in a carrier which moves from measuring stage to measuring stage. At each stage the set fiber sample is coupled to the incident and emergent ends of the stage and automatically subjected to the measurement to which the stage is dedicated. Bending units provide a desired degree of curvature to the fiber sample under test to control light propagation therein.

24 Claims, 10 Drawing Figures

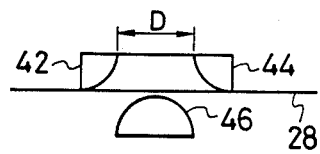
FIG. 3A
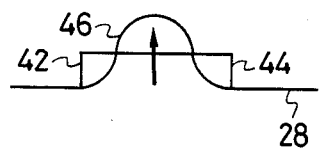
FIG. 3B
FIG. 4
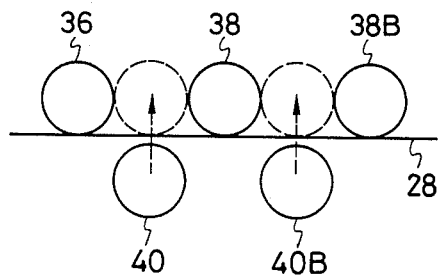
FIG. 5
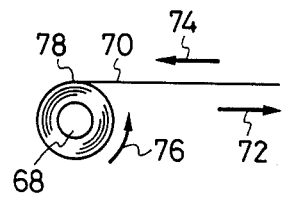

OPTICAL FIBER CHARACTERISTIC MEASUREMENT

BACKGROUND OF THE INVENTION

This invention relates in general to devices for measuring characteristics of optical fiber. More particularly, the invention provides an optical fiber characteristic measuring device for automatically and successively measuring the characteristic data of a single mode optical fiber such as, for examples, structural parameters—outside diameter, core diameter, core eccentricity and non-circularity and non-structural parameters—spot size, cutoff wave length, and specific fraction difference.

Various parameters of a single mode optical fiber can be measured. These include geometrical structural parameters such as outside diameter, core diameter and core non-circularity, and non-structural parameters such as for examples, spot size, transmission loss, dispersion, backward scattering, cut off length, and specific refraction difference.

In general, in measuring geometrical structural parameters such as outside diameter, core diameter and core non-circularity, and the various other parameters, such as, spot size, cutoff wave length, and specific refraction difference, a portion of the optical fiber, approximately 1 to 2 m in length, is removed as a sample (i.e., the measurement with light transmitted through the entire optical fiber is not carried out because of the nature of the measurement) and is measured. The measured characteristics of the sample are assumed to be those of the entire optical fiber from which the sample was taken (for instance a bobbin of optical fiber).

Heretofore, for each of the above-described items of measurement, the ends of an optical fiber to be tested are set with respect to optical incident and emergent ends, such as the ends of optical fibers, which are connected to an ITV camera, a photo detector, a light source for a measuring instrument, and a light receiving unit, and are positioned. Under this condition, the measurement is carried out. Measurement is generally performed by a human operator stationed at each measuring instrument. Whenever a different parameter is to be measured, the optical fiber to be measured must be set again. This takes a considerable amount of time and labor. Furthermore, the optical fiber setting work cannot be carried out during the period of time that an optical fiber characteristic is being measured by a measuring instrument. This difficulty may be eliminated by alternately performing the optical fiber setting work and the measurement. However, even alternating, the number of items measured by one operation is only two. Thus, the conventional method of measuring the characteristics of a single mode optical fiber requires excessive labor and time. It is an extremely inefficient process.

SUMMARY OF THE INVENTION

With the advent of newly developed optical fiber manufacturing techniques, it has become possible to produce large quantities of high quality optical fiber. Demand has increased for a way to inspect optical fibers with a high degree of accuracy and in an efficient manner. Of particular interest are the following parameters: (i) Cutoff wavelengths, (ii) geometrical data such as a core diameter, outside diameter, core non-circularity, and core eccentricity with respect to outside diameter, and (iii) spot sizes of optical fibers are most important optical parameters and are therefore essential items to be measured in the inspection of optical fibers. These can be measured by using a sample of an optical fiber which is about 2 m, as described above.

This invention provides a highly accurate single mode optical fiber characteristic measuring device which can efficiently, automatically and successively measure the geometrical structural parameters, such as outside diameter, core diameter, core eccentricity, and non-circularity, spot size, cut off wavelength, and specific refraction difference of a single mode optical fiber.

A set stage for setting an optical fiber under measurement on a carrier and measuring stages for measuring characteristics of the optical fiber on the carrier are arranged successively in a direction of movement of the carrier. Each measuring stage has optical measuring system incident and emergent ends. The carrier on which the optical fiber under measurement has been set is moved from one measuring stage to the next, successively. At each stage the two ends of the optical fiber under measurement are aligned with the optical measuring system incident and emergent ends, respectively. The characteristic measurement to be carried out by the stage is performed. At the carrier are provided: holders for holding the two ends of the optical fiber sample under measurement, and a first optical fiber bending unit adapted to accurately bend the optical fiber with a first radius of curvature in such a manner that the bend corresponds to one circumference of the circle having the first radius of curvature, to control the propagation mode in the optical fiber are provided on the carrier, and a second optical fiber bending unit adapted to bend the optical fiber under measurement with a second radius of curvature smaller than the first radius of curvature in such a manner that the bend corresponds to more than one circumference of the circle having the second radius of curvature.

First an optical fiber to be measured is set on the carrier at the set station. Then, the carrier on which the optical fiber has been set is sent to the next stage, i.e., the measuring stage so that the measurement assigned to the stage is carried out, while the next optical fiber is set on the next carrier at the set state. Once the optical fiber is set on the carrier at the set stage, the carrier is circulated automatically through the measuring stages so that a variety of characteristics of the optical fiber can be measured.

As is apparent from the above description, in the single mode optical fiber characteristic measuring device of the invention, the stage at which an optical fiber is set on the carrier is different from the stages where the characteristics of an optical fiber are measured. Therefore, while the characteristics of one fiber sample are being measured, the next fiber sample can be set on the next carrier. Accordingly, the time can be economically used, and a variety of characteristics of an optical fiber can be measured merely by setting the optical fiber on the carrier. The number of optical fiber sample items which can be measured per unit time by one operator is remarkably increased.

A first optical fiber bending unit is provided on the carrier so that the optical fiber set on the carrier is bent with a predetermined radius of curvature and that it may not be unnecessarily bent. In this manner, the propagation mode of the optical fiber under measurement is controlled, so that the necessary mode is maintained.

BRIEF DESCRIPTION OF THE DRAWINGS

FIGS. 3(A) and 3(B) show one example of an optical fiber bending unit providing a small radius of curvature to the optical fiber sample under measurement. More specifically, FIG. 3(A) is an explanatory diagram showing the optical fiber bending unit which is going to bend the optical fiber with the small radius of curvature, and FIG. 3(B) is an explanatory diagram showing the optical fiber bending unit which has bent the optical fiber with the small radius of curvature.

FIG. 4 is a schematic diagram showing another example of the optical fiber bending unit adapted to bend an optical fiber with the small radius of curvature.

FIG. 5 is a schematic diagram showing one example of a tensile force applying device which applies a predetermined tensile force to another optical fiber bending unit for giving the large radius of curvature to an optical fiber under measurement.

DETAILED DESCRIPTION OF PREFERRED EMBODIMENTS OF THE INVENTION

Examples of a single mode optical fiber characteristic measuring device according to the principles of the invention will be described with reference to the accompanying drawings.

First, the measurement of cutoff wavelength of a typical single mode optical fiber will be described.

Figure 9:
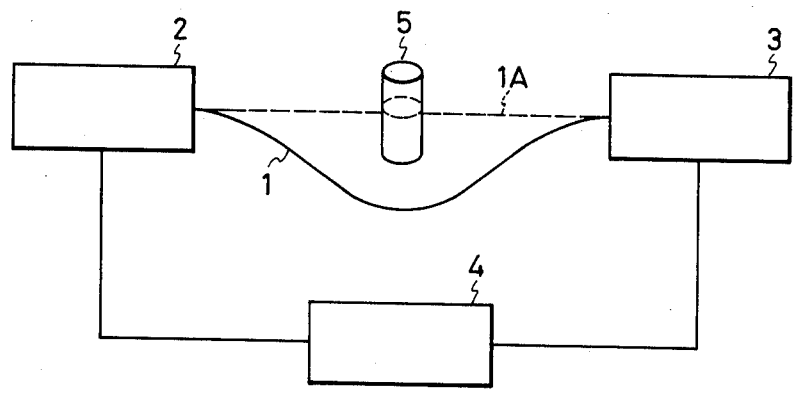
FIG. 9 is a schematic diagram showing the fundamental arrangement which practices a method of measuring the cutoff wave length of an optical fiber according to the "bending method".

For a single mode optical fiber, cutoff wavelength is an important parameter. It indicates the critical wavelength which allows the optical fiber propagate light in only a single mode. Accordingly it is essential to measure the cutoff wavelength with high accuracy. A method which is extensively used to obtain the cutoff wavelength is a "bending method" which described in "Optical Communication Handbook", page 437, FIG. 5.4.29, published by the "Asakura Shorten", Sept. 1, 1982. A typical measuring device according to the bending method is shown in FIG. 9. An optical fiber 1 to be measured having a suitable length is connected between a wavelength-variable light source 2 and a photo-detector 3. Light source 2 and detector 3 are connected to a control, arithmetic device 4.

When optical fiber 1 to be measured is not bent, as indicated by the solid line in FIG. 9, under the control of control/arithmetic device 4 a light beam from wavelength-variable light source 2 is swept in a predetermined range of wavelengths. At each of the wavelengths the output optical power $P_1(\lambda)$ of the optical fiber 1 is detected by photo detector 3 and stored in the control/arithmetic device 4.

Thereafter, with the condition of connection of the optical fiber 1 with the light source 2 and the photo detector 3 maintained unchanged, optical fiber 1 is wound on a mandrel 5 having a suitable diameter, as indicated by the broken line 1A in FIG. 9. Under the control of the control/arithmetic device 4, the light beam emitted from light source 2 is swept in the same range, and at each of the wavelengths the output optical power $P_2(\lambda)$ is detected by photo detector 3 and stored in control/arithmetic device 4.

Figure 10:
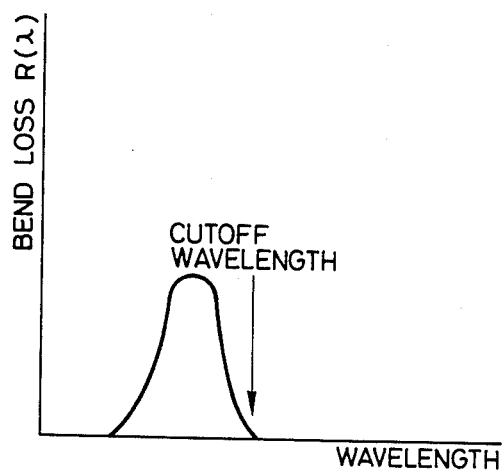
FIG. 10 is a graphical representation indicating one example of the data which is provided by the method of measuring the cutoff wavelength of a single mode optical fiber.

The ratio of the optical output stored when the optical fiber is not been to the optical output stored when the optical fiber is bent; for instance the following equation (1) is calculated by the control/arithmetic device 4, and a graphical representation indicating bend loss with wavelength; i.e., a graphical representation indicating the wavelength characteristic of bend loss of the optical fiber is formed as shown in FIG. 10. According to the wavelength characteristic, the cutoff wavelength can be obtained as the rise point of the bend loss.

$$R(\lambda) = 10 \log \frac{P_1(\lambda)}{P_2(\lambda)} \quad (1)$$

However, the conventional measurement of the cutoff wavelength of a single mode optical fiber according to the above-described "bending method" is insufficient in accuracy of measurement and in the operation of measurement. Measurement accuracy of the cutoff wavelength may be affected by the variation in connection of both ends of the optical fiber which is caused when the optical fiber is bent, and therefore care must be taken not to change the condition of connection of the two ends of the optical fiber. In other words, if the condition of the connection is changed, the quantity of light applied to the photo detector is changed irrespective of the optical fiber wavelength dependability.

In the above-described "bending method", both ends of an optical fiber to be measured are fixed, and the optical fiber thus fixed is not bent. Thereafter, in order to bend the optical fiber, it is wound on the mandrel. In so doing, the optical fiber is unavoidably rotated around its central axis. In other words, the optical fiber is twisted. In general, a covered optical fiber has a large restoring force against the twist applied thereto. Therefore, the twist affects the condition of connection of both ends of the optical fiber, thus adversely affecting the accuracy of measurement.

Furthermore, the covered optical fiber has a restoring force against the bend applied thereto. Therefore, it is difficult to stably hold the optical fiber merely by winding it on the mandrel. Accordingly, it is necessary to use, for instance, an adhesive tape to fix the optical fiber on the mandrel, which lowers the efficiency of measurement.

Furthermore, in the above-described "bending method", the reproducibility and the stability of the condition that the optical fiber is not bent are low, and therefore the result of measurement is low in reliability. A first reason for this is that, since "the condition that the optical fiber is not bent" has not been clearly defined, how to set the optical fiber is left to the person making the measurement. Different persons, or different measurements may provide different "conditions that the optical fiber is not bent". A second reason is that, when the optical fiber is dangled as shown in FIG. 9, the measurement value is greatly changed by the slight variation in state of the optical fiber.

Therefore, CCITT (International Consultative Committee for Telephone and Telegraph) has advised the following matter in "Revised Version of Recommendation G652 Characteristics of A Single Mode fiber cable", pp 15 to 18, May 1984: "The condition that an optical fiber is not bent" is the condition that the optical fiber is bent with a large radius of curvature 140 mm; and "the condition that an optical fiber is bent" is the condition that the optical fiber is bent with a small radius of curvature 30 mm. Comparison of the wavelength dependabilities in the two conditions is carried out in the same method as the conventional method, thereby to obtain the cutoff wavelength. Furthermore, the following measuring conditions are added: In giving the large radius of curvature to the optical fiber, a radius of curvature smaller than the large radius of curvature shall not be given to the optical fiber, and the part of the optical fiber which is bent shall be a part of the circumference having the large radius of curvature. On the other hand, in giving the small radius of curvature to the optical fiber, a radius of curvature smaller than the small radius of curvature shall not be give to the optical fiber, and the part of the optical fiber which is bent shall be a part of the circumference having the small radius of the curvature.

The bending described above is to control the mode of propagation in the single mode optical fiber, and the bending of the radius of curvature 30 mm is to limit the mode of propagation in the optical fiber to the $LP_{01}$ mode which is the lowest order mode.

The cutoff wavelength parameter is measured as described above. On the other hand, for instance in the measurement of a spot size, in order to measure a single mode spot size, it is necessary to bend the optical fiber as described above.

However, even in the method advised by CCITT, the optical fiber having its two ends fixed must be wound along the circuit having a predetermined radius one turn, and therefore the problems, namely the twist of the optical fiber and the restoring force of the optical fiber, remain. The optical fiber is twisted, the condition of connection of both ends of the optical fiber is changed; and furthermore the covered optical fiber has the restoring force against the bending given thereto, and therefore the posture of the optical fiber is unstable merely by winding it on the mandrel. Accordingly, it is necessary to use, for instance, an adhesive tape to fix the optical fiber. This optical fiber fixing work is troublesome. It takes a relatively long time to wind the optical fiber on the mandrel large in diameter, 280 MM for instance, in a manner that the optical fiber is fixedly held on the mandrel. In addition, in the optical fiber fixing work, a bend such a micro-bend which adversely affects the measurement is liable to be caused with the optical fiber by the use of the adhesive tape.

Accordingly, the single mode optical fiber characteristic measuring device of the invention is so designed that, in the measurement, an optical fiber under measurement is not twisted and can be bent stably, and the optical fiber can be readily held and bent, whereby the accuracy of measurement is held high, the efficiency of measurement is improved, and time and labor for measurement can be economically used.

Accordingly, the device which can bend an optical fiber in stable posture without twisting it, and can readily hold and bend the optical fiber is provided on a carrier.

Figure 1:
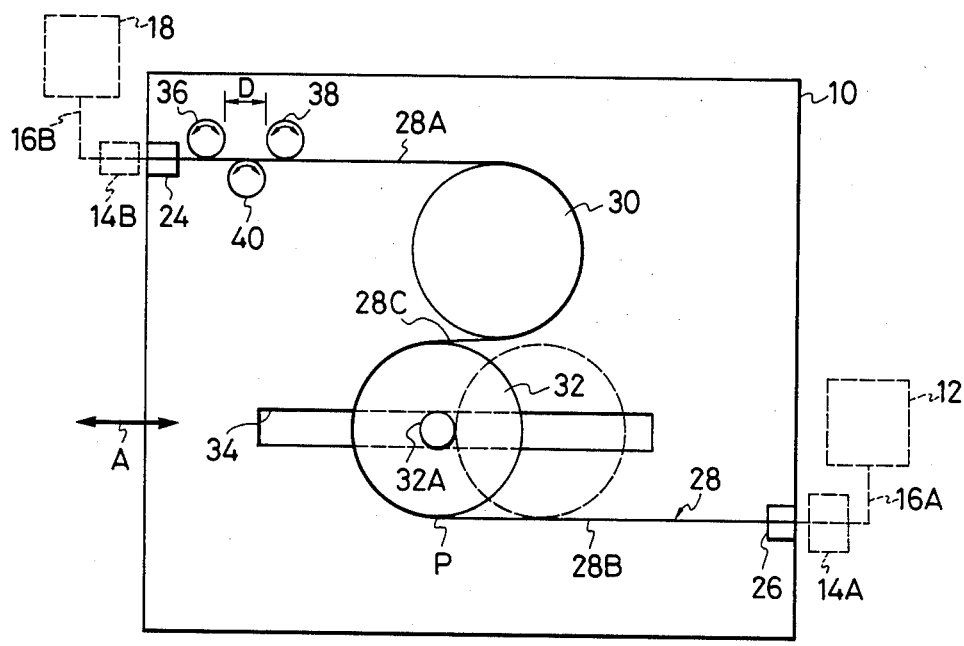
FIG. 1 is a schematic diagram showing the arrangement of one example of a carrier used in a single mode optical fiber characteristic measuring device according to this invention, in which the optical fiber sample being measured is subjected to a large radius of curvature.
Figure 2:
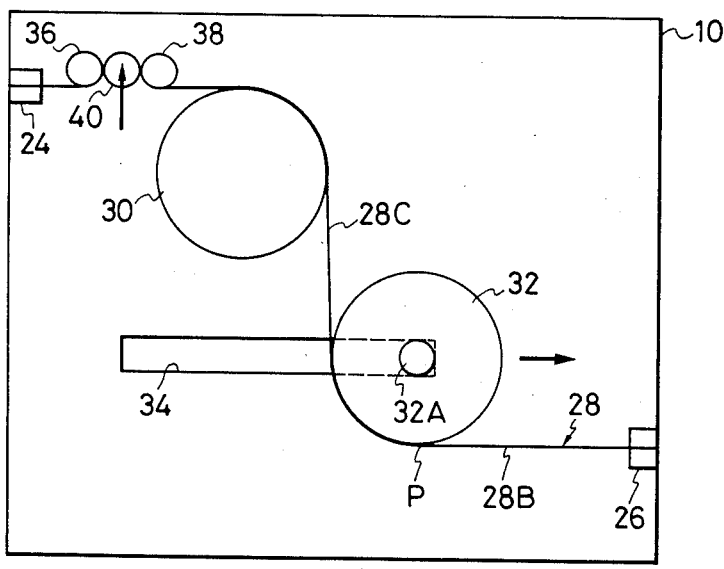
FIG. 2 is a schematic diagram showing the carrier in which the optical fiber is subjected to a small radius of curvature.

FIGS. 1 and 2 are diagrams outlining the arrangement of the carrier used in the single mode optical fiber characteristic measuring device according to the invention. More specifically, FIG. 1 shows the optical fiber under measurement which is set on the carrier and bent with the large radius of curvature, and FIG. 2 shows the optical fiber which is set on the carrier and bent with the small radius of curvature.

As shown in FIGS. 1 and 2, optical fiber holders 24 and 26 are arranged on the diagonal line of the carrier 10 and near the opposite two sides of the latter. These holders 24 and 26 are so designed that, even when a relatively large tensile strength is applied to an optical fiber 28 under measurement, the holders hold the optical fiber 28 with a force large enough to hold the optical fiber. The positions of the holders 24 and 26 can be finely adjusted in the X-direction and in the Y-direction which are perpendicular to the optical axis of the optical fiber 28 and to each other, and in the Z-direction which is in parallel with the optical axis of the optical fiber 28. The optical fiber holders may be the holders and the centering devices which have been disclosed by Japanese Patent Application Nos. 223011/1984 and 240986/1984.

A first optical fiber bending unit adapted to bend an optical fiber 28 under measurement with the large radius of curvature, and a second optical fiber bending unit adapted to bend an optical fiber 28 under measurement with the small radius of curvature are provided between optical fiber holders 24 and 26.

The first optical fiber bending unit comprises: large rollers 30 and 32, for instance, 280 mm in diameter which are members for bending an optical fiber with the large radius curvature. Large rollers 30 and 32 are so arranged that their cylindrical walls are in contact with the prolongations of the parts of the optical fiber held by holders 24 and 26, respectively, and the optical fiber is not bent at the border between the part of the optical fiber held by the holder 24 and part 28A of the optical fiber which is located between the large roller 30 and holder 24, and at the border between the part of the optical fiber held by holder 26 and the part 28B of the optical fiber which is located between large rollers 32.

Furthermore, large rollers 30 and 32 are so positioned that parts 28A and 28B of the optical fiber 28 are in parallel with each other, and part 28C of the optical fiber which is located between the large rollers 30 and 32 i.e., the common line tangent to the large rollers 30 and 32 is in parallel with parts 28A and 28B of the optical fiber.

One of the large rollers 30 and 32, for instance large roller 30, is fixedly positioned so that it may not be displaced. The other large roller, for instance large roller 32 has a central shaft 32A which is engaged with a guide groove 34 so that it may slide along the groove 34. The guide groove 34 is formed in the carrier 10 in such a manner that is is extended in parallel with the prolongation of the part of the optical fiber 28 which (part) is held by the holder 26; i.e., in parallel with the direction of the tangent which touches the point P from which the bending of optical fiber 28 by large roller 32 starts.

In sliding shaft 32A of large roller 32 along guide groove 34, a frictional resistance is provided to the extent that the operator or measuring person can readily slide the large roller 32, but the elastic force of the optical fiber cannot slide the large roller 32. Accordingly, when large roller 32 is moved in the directions of the arrow A, parts 28A, 28B and 28C of optical fiber 28 are maintained linear and parallel with one another; that is, they are never bent, as long as the optical fiber is tightened.

The second optical fiber bending unit adapted to bend an optical fiber 28 under measurement with the small radius of curvature has small-radius-of-curvature bending members, namely, small rollers 36, 38 and 40, for instance, 60 mm in diameter which are arranged between the optical fiber holder 24 and large roller 30.

Each of small rollers 36, 38 and 40 has the radius of curvature which is to be given to the optical fiber. Small rollers 36 and 38 are positioned on one side of the optical fiber 28 and are spaced from each other by the distance D equal to the diameter of the small roller 40. Small rollers 36 and 38 are in contact with the optical fiber 38 so that they may not directly bend the latter.

The other small roller 40 is provided on the opposite side of optical fiber 28. In order to bend optical fiber 28 with the small radius of curvature, small roller 40 goes in between the small rollers 36 and 38 while pushing the optical fiber 28 to the extent that the centers of three small rollers are arranged in one line or the center of the small roller 40 goes across the line connecting the centers of the other small rollers 36 and 38, as shown in FIG. 2.

When small rollers 36, 38 and 40 are positioned as shown in FIG. 1, optical fiber 28 is not bent with the small radius of curvature. When small rollers 36, 38 and 40 are positioned as shown in FIG. 2, optical fiber 28 is bent with the small radius of curvature, and the bend corresponds to the circumference of the small roller 40.

When the above-described carriage is positioned at a set stage, an optical fiber to be measured is set on the carriage. When the carriage is positioned at a cutoff wavelength measuring stage in a measuring station (described later), the measurement is carried out.

In order to set an optical fiber on the carriage at the set stage, small roller 40 is placed at a first position as shown in FIG. 1, and the movable large roller 32 is moved to the right position as indicated by the dotted line in FIG. 1. Under this condition, an optical fiber having a predetermined length, for instance 2 m, is wound on large rollers 30 and 32, and both ends of the optical fiber are held by holders 24 and 26, respectively. Then, large roller 32 is moved to the left in FIG. 2 so that optical fiber 28 is tightened to the extent that no excessive tensile force is applied to the optical fiber.

As a result, parts 28A, 28B and 28C of optical fiber 28 become straight and parallel with one another. Accordingly, the optical fiber is bent by the large rollers 30 and 32 so that each of the two bends formed by the large rollers corresponds to a half ($\frac{1}{2}$) of the circumference of the large roller 30 or 32; that is, the sum of the two bends corresponds to the circumference of the large roller 30 or 32. In the above-described operation, the optical fiber 28 is bent in the form of the character "S", and therefore it is never twisted. Accordingly, the condition of holding the optical fiber with holders 24 and 26 is maintained unchanged.

Under this condition, a light source 12 (indicated by the dotted line in FIG. 1) provided at the set stage applies a light beam having a particular wavelength through a measuring instrument. Optical fiber 16A held by a measuring instrument optical fiber holder 14A to one end of optical fiber 28. The light beam thus applied emerges from the other end of the optical fiber and is applied through a measuring instrument optical fiber 16B held by a measuring instrument optical fiber holder 14B to a photo detector 18 provided are finely adjusted in the X-, Y- and Z-directions so that the output of the photo detector 18 becomes maximum. As a result, the distance between light source 12 and one end of optical fiber 28, and the distance between the photo detector 18 and the other end of the optical fiber 28 are adjusted to several tens of microns (pm), and the optical axes of light source 12 and photo detector 18 at the set stage are coincided with the optical axis of the optical fiber 28.

The carrier on which the optical fiber has been set as described above is moved to the cutoff wavelength measuring stage. At the measuring stage, the relative position of a measuring instrument optical fiber connected to a light source and a measuring instrument optical fiber connected to a photo detector is substantially the same as that of the measuring instrument optical fibers at the set stage. Therefore, the optical axes of both ends of the optical fiber under measurement coincide with the optical axes of the light source and photo detector at the cutoff wavelength measuring stage. Under this condition (FIG. 1), under the control of a control/arithmetic device at the cutoff wavelength measuring stage, a light beam from the light source is swept in a predetermined range of wavelengths, and at each wavelength an optical power $P_1(\lambda)$ which is transmitted through the optical fiber and detected by the photo detector is stored in the control/arithmetic device.

Thus, the measurement of the optical power provided when the optical fiber is bent to have the large radius of curvature has been accomplished.

Next, while large roller 34 is moved to the right in FIG. 1 smaller roller 40 is moved in between the other small rollers 36 and 38 in such a manner that optical fiber 28 is not slackened, as shown in FIG. 2. As a result, each of the bends given to the optical fiber by the large rollers is shorter than a half of the circumference of each large roller, while the sum of the bends given to the optical fiber by small rollers 36, 38 and 40 is equal to the circumference of each small roller.

Under this condition (FIG. 2), under the control of the control/arithmetic device at the cutoff wavelength measuring stage, the light beam emitted from the light source at the cutoff wavelength measuring stage are swept in the same range of wavelengths, and at each wavelength an optical power $P_2(\lambda)$ which is transmitted through the optical fiber 28 and detected by the photo detector at the cutoff wavelength measuring stage is stored in the control/arithmetic device.

Thus, the wavelength characteristics of the light propagated through the optical fiber under two different conditions have been measured. In addition, according to the above-described equation (1), the value $R(\lambda)$ is calculated, and the cutoff wavelength of the optical fiber under measurement is calculated.

In the above-described embodiment, the large rollers 30 and 32, and the small rollers 36 and 38 are so designed as not to turn around their axes. Accordingly, when the small roller 40 is moved from its position in FIG. 1 to its position in FIG. 2, the optical fiber 28 is slid along the cylindrical walls of the rollers. In the case where an optical fiber under measurement is a core wire secondarily covered with "Nylon" or the like, the frictional resistance may be reduced by suitably selecting the material, configuration and surface treatment of the rollers; that is, stress applied to the optical fiber can be decreased by the method. On the other hand, in the case where an optical fiber under measurement is an element wire primarily covered with silicon resin or the like, the frictional resistance is large. Therefore, greatest stress is applied to the optical fiber, and the transmission characteristic of the latter may be changed.

The above-described difficulty can be eliminated by modifying the large rollers 30 and 32 and the small rollers 36 and 38 in such a manner that they are rotatable around their axes. If the large rollers and the small rollers are modified as described above, then when the small roller 40 is moved from its position in FIG. 1 to its position in FIG. 2 the rollers which are in contact with the optical fiber 28 are rotated with the movement of the optical fiber; that is, the optical fiber will never be slid on the rollers. Therefore, even if the optical fiber is an element wire, no unwanted stress is applied to the optical fiber, and accordingly the transmission characteristic of the latter is maintained unchanged. Thus, the cutoff wavelength of the optical fiber which is an element wire can be measured with high accuracy.

In the above-described embodiment, the second unit for providing the small radius of curvature to an optical fiber under measurement comprises the small rollers 36, 38 and 40. However, the second unit may be made up of small-radius-of-curvature bending members 42, 44 and 46 as shown in FIG. 3. Bending members 42, 44 and 46 are accurate in section, and the sum of the arcs of the bending members is equal to the circumference of the circle which has the small radius of curvature to be given to the optical fiber. More specifically, each of the bending members 42 and 44 has a curved surface which corresponds to a quarter of the circle having the small radius of curvature. The bending members 42 and 44 are arranged on one side of the optical fiber in such a manner that the curved surfaces confront with each other and with the optical fiber 28. The curved surfaces of the bending members 42 and 44 are in contact with the optical fiber through their corners in such a manner that the optical fiber 28 is maintained straight (or not bent by the corners), and the distance D between the bending members 42 and 44 is twice as long as the radius of curvature.

The other bending member 46 has a curved surface which corresponds to a half of the circle. The bending member 46 is disposed on the opposite side of the optical fiber 28 in such a manner that the curved surface confronts with the optical fiber 28. In the case where the optical fiber is bent to have the small radius of curvature, as shown in the part (b) of FIG. 3 the bending member 46 is so moved that the centers of the arcs of the three bending members 42, 44 and 46 are arranged in one line or the center of the arc of the bending member 46 goes across the line connecting the centers of the arcs of the bending members 42 and 44.

When the bending members 42, 44 and 46 are positioned as shown in the part (a) of FIG. 3, the optical fiber 28 is maintained straight. When the bending members 42, 44 and 46 are positioned as shown in the part (b) of FIG. 3, the bend of the small radius of curvature is given to the optical fiber 28. If, in this operation, the movement of the bending member 46 is proper, then the bend corresponding to a quarter ($\frac{1}{4}$) of the circle having the small radius of curvature is given to the optical fiber 28 by each of the bending members 42 and 44, while the bend corresponding to a half ($\frac{1}{2}$) of the circle is given to the optical fiber 28 by the bending member 46.

In the modification of the second unit shown in FIG. 3, the curved surfaces of the bending members 42, 44 and 46 should be maintained in the predetermined directions, respectively, at all times; that is, they should not be rotated. Therefore, when the bending member 46 goes in between the other bending members 42 and 44, the optical fiber may be rubbed by the bending members.

The second unit for bending the optical fiber may be modified as shown in FIG. 4. In addition to the small rollers 36, 38 and 39, two more small rollers 38B and 40B are employed. In the modification, the bend corresponding to two times the circumference of the small roller can be given to the optical fiber 28 by causing the small rollers 40 and 40B to go in between the small rollers 36 and 38 and between the small rollers 38 and 38B, respectively, in such a manner that the centers of the small rollers 36, 38, 38B, 40 and 40B are arranged in one line, or the centers of the small rollers 40 and 40B go across the line connecting the small rollers 36, 38 and 38B.

In the above-described carrier in the single mode optical fiber characteristic measuring device according to the invention, the optical fiber 28 is maintained tightened by sliding the large roller 32 along the guide 34. However, this operation is troublesome. The degree of tightening the optical fiber; i.e., the tensile force acting on the optical fiber is determined by the feeling of the operator, or the measuring person, and therefore the measurement cannot be carried out without changing the tensile force acting on the optical fiber. Furthermore, it is necessary to adjust the tensile force to the extent that the optical fiber is not slackened around the bending members, and the stress which may affect the transmission characteristic of the optical fiber is not applied to the optical fiber. That is, the adjustment of the tensile force acting on the optical fiber is considerably difficult. If the tensile force is excessive, then large force such as side pressure is applied to the optical fiber, to change the transmission characteristic of the latter, and to displace the optical fiber which has been positioned by the optical fiber holders.

As was described above, an optical fiber has a restoring force against the bending given thereto. Therefore, if, in setting the optical fiber on the carrier as shown in FIG. 1, the optical fiber is bent merely by laying it on the bending members, then the optical fiber may slip off. Accordingly, the operation that the optical fiber is wound on the large rollers, and the large roller 32 is slid to tighten the optical fiber must be carried out skillfully.

This problem may be solved by employing the following means: A predetermined tensile force is provided in the direction in which the large-radius-of-curvature bending member such as the large roller 32 is movable and the tensile force is applied to the optical fiber, at all times.

FIG. 5 shows a tensile force applying device simple in construction which can provide a predetermined tensile force.

The device shown in FIG. 5 comprises a thin leaf spring 70 which has one end rotatably coupled to the rotary shaft 32A of the large roller in FIG. 1, and the other end fixedly secured to a drum 68, and which is tightly wound on the latter 68. The drum 68 is rotatably supported at a stationary point.

The spring 70 is a so-called "constant load spring". As the spring 70 is pulled out in the direction of the arrow 72, the drum 68 is rotated to provide a tensile force in the direction of the arrow 74. As the drum 68 is rotatable, the drum tends to turn in the direction of the arrow 76, thus providing a constant tensile force in the direction of the arrow 74 irrespective of the amount of pull-out of the thin leaf spring 70. The reason why the tensile force is constant is that the force along the thin leaf spring is produced only at the part 78 where the thin leaf spring is deformed.

Figure 6:
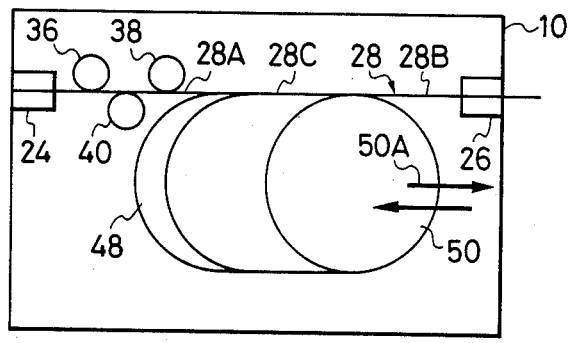
FIG. 6 is a schematic diagram showing another example of the carrier used in the single mode optical fiber characteristic measuring device, in which the large radius of curvature is given to an optical fiber under measurement.
Figure 7:
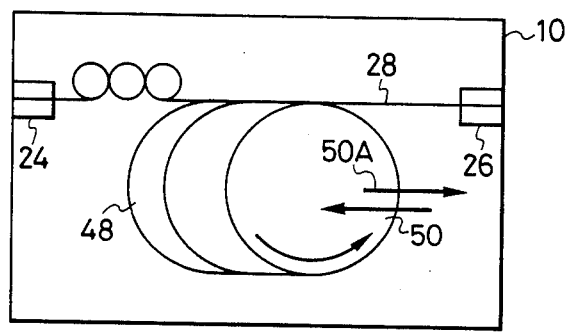
FIG. 7 is a schematic diagram showing the same carrier in which the small radius of curvature is given to the optical fiber.

In the above-described embodiment, the first unit for bending an optical fiber under measurement has two rotatable cylindrical bending members; however, the first units are not limitative in the invention. That is, the first unit maybe modified as shown in FIGS. 6 and 7. In the modification, one of the pair of large-radius-of-curvature bending members forming the first unit is modified into a crescent-shaped member 48, and the other is used as a large roller 50. The crescent-shaped member 48 and the large roller 50 are so positioned that they have two common tangent lines which are in paralleled with each other and one of the tangent lines coincides with the common prolongation of the parts of the optical fiber 28 which are held by the optical fiber holders 24 and 26, and that the optical fiber is maintained straight at the border between the part of the optical fiber held by the holder 24 and the part 28A of the optical fiber which is located between the crescent-shaped member 48 and the holder 24 and at the border between the part of the optical fiber held by the holder 26 and the part 28B of the optical fiber which is located between the large roller 50 and the holder 26. The parts 28A and 28B of the optical fiber 28, and one 28C of the common tangent lines between the crescent-shaped member 48 and the large roller 50 form one straight line.

The crescent-shaped member 48, one of the large-radius-of-curvature bending members, is fixedly held so that it may not move. Similarly as in the embodiment shown in FIGS. 1 and 2, the other large radius-of-curvature bending member, namely, the large roller 50 is movable in directions 34A and 34B which are in parallel with the parts 28A, 28B and 28C of the optical fiber 28 under measurement, and is rotatable. The large roller 50 is provided with a tensile force applying device (not shown in FIGS. 6 and 7) which is similar to that shown in FIG. 5. The tensile force applying device is adapted to provide a predetermined tensile force to move the large roller in the direction of the arrow 50; i.e., to move the large roller away from the crescent-shaped member 48.

In the case where the carrier has the above-described large-radius-of-curvature bending members, it is preferable to arrange the small rollers 36, 38 and 40 beside the crescent-shaped member 48 for the following reasons: When the small rollers operate to bend the optical fiber, the crescent-shaped member 48 is maintained fixed, while the large roller 50 is slid while rotating in a manner to supply the optical fiber. Therefore, similarly as in the embodiment shown in FIGS. 1 and 2, the operation is smoothly carried out. Furthermore, the bending members can be arranged compact, which contributes to miniaturization of the carrier.

In the above-described examples of the carrier, the small-radius-of-curvature bending members are provided on the carrier; however, it should be noted that, for some of the measurement items, it is unnecessary to use the small-radius-of-curvature bending members. Therefore, the small-radius-of-curvature bending members may be provided at a measuring stage where the operation of the small-radius-of-curvature bending members is required for the measurement item.

Figure 8:
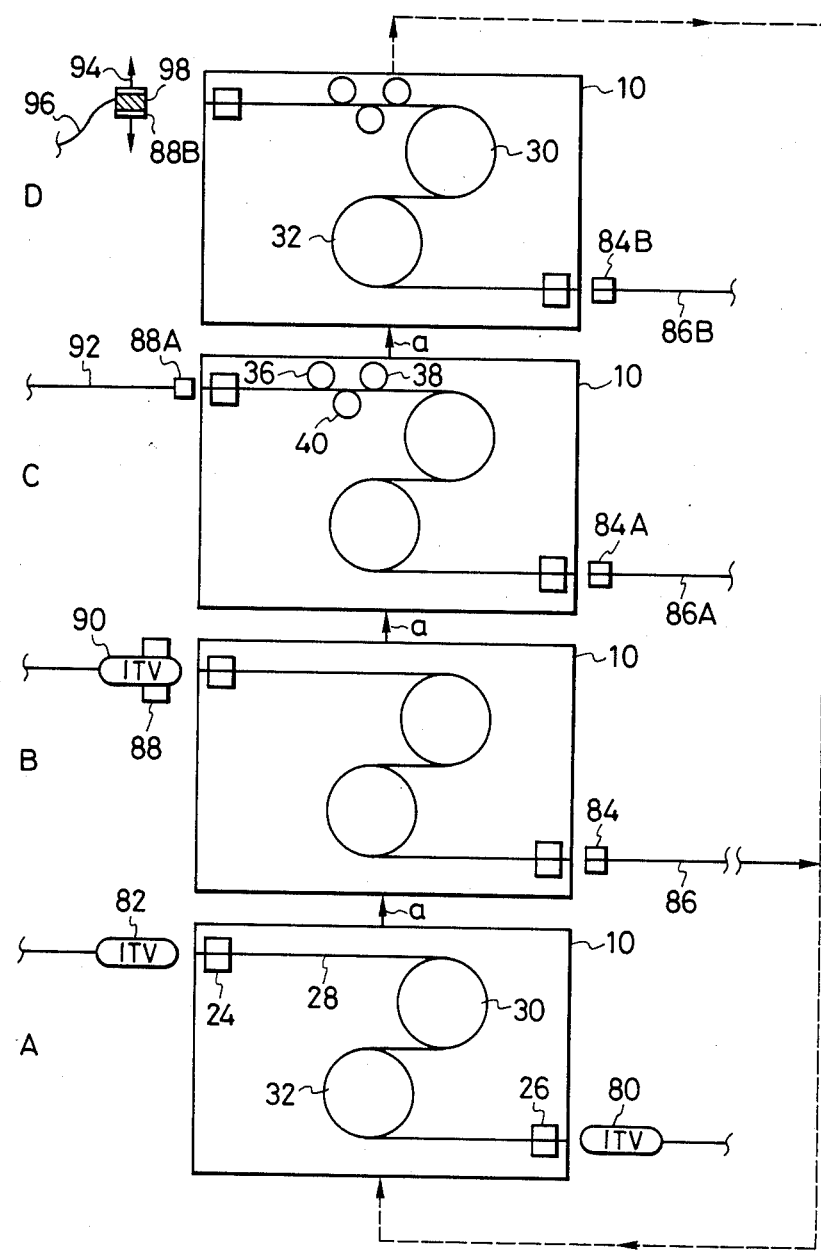
FIG. 8 is a diagram showing the arrangement of one specific embodiment of the single mode optical fiber characteristic measuring device according to the invention.

FIG. 8 is a plan view of another example of the single mode optical fiber characteristic measuring device according to the invention in which the small-radius-of-curvature bending members arranged only at the measuring stages where the operation of the small-radius-of-curvature bending members is required for the measuring items.

The single mode optical fiber characteristic measuring device shown in FIG. 8 has an optical fiber set stage A, and three measuring stages B, C and D. In the measuring device of the invention, the above-described carrier 10 is moved through the plurality of stages A and D in a circulation manner, or in the direction indicated by the arrows a. The carrier 10 has no small-radius-of-curvature bending members, but has the large-radius-of-curvature bending members, namely, the small rollers 36, 38 and 40 are provided at the measuring stages C and D.

The light source and the photo detector, shown in FIG. 1, may be provided in combination as the mechanism for adjusting the optical fiber under measurement which is held by the holders 24 and 26 at the set stage A; however, in the example shown in FIG. 8, ITV cameras 80 and 82 adapted to photograph the holders 24 and 26 are employed.

At the measuring stage B, an optical fiber 86 connected to a light source and held by a holder 84, and an ITV camera 90 held by a holder 88 are arranged. The relative position of the optical fiber 86 and the ITV camera 90 is the same as that of the ITV camera 80 and the ITV camera 82 at the set stage A.

At the measuring stage C, an optical fiber 86A connected to a light source and held by a holder 84A, and an optical fiber 92 held by a holder 88A and connected to a photo detector are provided, and the relative position of them is the same as that of the ITV cameras 80 and 82 at the set stage A.

At the measuring stage D, and optical fiber 86B connected to a light source and held by a holder 84B, and a light receiving unit 98 held by a holder 88B are arranged, and the relative position of them is also the same as that of the ITV cameras 80 and 82 at the set stage A.

An optical fiber 28 under measurement is wound on the large rollers 30 and 32 on the carrier 10 at the set stage A, and both ends thereof are held by the holders 24 and 26, respectively. At the set stage A, the ITV cameras 80 and 82 are operated to observe the conditions of the end faces of the optical fiber 28 and to detect whether or not the optical fiber is satisfactorily held by the holders 24 and 26, thereby to finely adjust the positions of the holders in the two orthogonal directions which are perpendicular to the optical axis of the optical fiber. Thereafter, the carrier 10 is sent to the stages B, C and D in the stated order.

When the carrier 10 moved to the measuring stage B is positioned in place, one of the two ends of the optical fiber 28 held by the holders 24 and 26 is aligned with the optical fiber 86 held by the holder 84 with a small gap there between, while the other end of the optical fiber 28 is also aligned with the ITV camera 90 held by the holder 88 with a small gap there between, and the optical axes thereof are substantially coincided with one another.

At the measuring stage B, the geometrical structural parameters of the optical fiber are measured. The optical fiber 86 held by the holder 84, receiving light from the light source (not shown), applies the light to the optical fiber 28 under measurement through its one end to illuminate the inside of the core. On the other hand, the ITV camera 90 held by the holder 88 measures a so-called "near field pattern" with the aid of the illumination of the core inside by the optical fiber 86 and the illumination performed by the ITV camera itself through the other end of the optical fiber 28. And, a core diameter, clad diameter, non-circularity and eccentricity are obtained from the near field pattern.

As is apparent, from the above description, that it is unnecessary to use the small-radius-of-curvature bending members in the measurement of the geometrical structural parameters of the optical fiber.

Thereafter, the carrier 10 is moved to the measuring stage C.

At the measuring stage C also, the end of the optical fiber 28 under measurement held by the holder 26 is aligned with the optical fiber 86A held by the holder 84a with a small gap there between, while the other end of the optical fiber under measurement held by the holder 24 is aligned with the optical fiber 92 held by the holder 88A with a small gap therebetween, and the optical axes thereof are substantially coincided with one another. The optical fiber 86A held by the holder 84A receives light from the light source (not shown) to excite the optical fiber 28 under measurement, while the optical fiber 92 connected to the photo detector (not shown) receives the light emerging from the optical fiber 28 under measurement. In this operation, first the measurement is carried out without bending the optical fiber 28 with the small rollers 36, 38 and 40, and thereafter the measurement is performed under the condition that the small roller 40 goes in between the other small rollers 36 and 38 until the centers of the three small rollers are arranged in one line the small-radius-of-curvature. The cutoff wavelength of the optical fiber is obtained from the comparison of the optical fiber wavelength dependabilities which have been detected through the above-described two measurements.

Both at the measuring stage C and at the measuring stage D (described later), the second unit for bending an optical fiber is so designed that the small rollers 36, 38 and 40 are movable in a direction perpendicular to the surface of the carrier 10; that is, they are movable vertically, and the small roller 40 is movable in a direction which is parallel with the surface of the carrier 10 and perpendicular to the optical fiber under measurement so that it can go in between the other small rollers 36 and 38. Accordingly, when the carrier 10 arrives at the measuring stage, the small rollers 36, 38 and 40 are held above. When the carrier 10 has been positioned in place, the small rollers 36, 38 and 40 are moved down to hold the optical fiber 28 between the small roller 40 and the remaining small rollers 36 and 38. When the small-radius-of-curvature is given to the optical fiber 28 under measurement, the small roller 40 is displaced in the direction which is parallel with the surface of the carrier 10 and perpendicular to the optical fiber 28, so as to go in between the remaining small rollers 36 and 38. After measurement, the small roller 40 is gradually moved away from the remaining small rollers 36 and 38, and then the three small rollers 36, 38 and 40 are moved above.

At the stage D, a spot size is measured. The optical fiber 86B held by the holder 84B, receiving light from the light source (not shown) excites the core of the optical fiber under measurement. A far field pattern from the other end of the optical fiber 28 under measurement is measured by the light receiving unit 98 which is held by the holder 88B, reciprocated as indicated by the arrows, and connected through a cable 98 to a measuring instrument (not shown), as a result of which the spot size of the optical fiber is measured.

In this operation also, the optical fiber is bent by the second unit in order to limit the mode of light propagating through the optical fiber core. The bending permits observation of the emergent pattern of the light which propagates, in a single mode, through the optical fiber under measurement. (As for the above-described measuring methods, "a method of utilizing a near field pattern to measure the dimensions of the end of an optical fiber" has been disclosed by the "Optical Communications Handbook", page 430, published by the "Asakura Shorten" (book store), Sept. 1, 1982, or "a far field pattern measuring method" has been indicated. In addition, "a method of measuring a spot size by utilizing a far field pattern" has been disclosed by the publication "Sumitomo Denki", pp 153 to 156, March 1983.

For each of the measurements described above, it is essential to align the optical incident and emergent points on the side of the measuring instrument with the ends of the optical fiber under measurement with high accuracy. Accordingly, it is necessary that the carrier is accurately positioned with respect to the optical incident and emergent points, the optical fiber is set on the carrier with high accuracy, and the optical fiber holders 24 and 26 are also positioned with high accuracy. This alignment can be automatically achieved with high accuracy by the following method: That is, the optical system input and output end holders 84 and 88 (or 84A and 84B and 88B) at the measuring stage B (or C, or D) are displaced perpendicularly to the axis of the optical fiber 28 until the optical power received by the light receiving unit becomes maximum. In the case where an image observing device such as an ITV camera, the adjustment is carried out through observation of the image of the optical fiber under measurement in such a manner that the image is within the screen.

According to the invention, the first bending unit for providing the large radius of curvature to an optical fiber to be measured is provided on the carrier, and all the measuring operations including those which are carried out by using the second bending unit for giving the small radius of curvature to the optical fiber are performed successively. At the tensile force applied to the optical fiber is controlled suitably, the optical fiber can be readily supplied, and the posture of the optical fiber can be maintained stable.

Furthermore, the control of the tensile force is achieved by the constant load spring provided on the carrier; that is, the tensile force can be controlled without using an external signal or drive power which is provided from outside the carrier. Thus, the measuring device is considerably simple in construction.

In the above-described example of the measuring device according to the invention, the geometrical structural parameters of an optical fiber are measured (by utilizing the near field pattern), and the cutoff wavelength (effective cutoff wavelength) is measured (by using the far field pattern). However, the measurement items and the measuring methods can be changed as necessary. In the measuring device as described above, each of the carriers is circulated through the stages, and all the carriers are moved at the same time. Therefore, if the periods of time required for the measuring operations at the measuring stages and the period of time required for setting an optical fiber on the carrier at the set station become equal to one another, then the time can be economically utilized; that is, the efficiency of measurement is improved as much. For this purpose, for instance in the case where the period of time required for measuring the geometrical structural parameters is relatively long, the stage may be divided into two stages, a core measuring stage and a clad measuring stage, so that the periods of time required for the measuring operations at all the stages are substantially equal.

With the measuring device of the invention, the alignment of the ends of an optical fiber under measurement with the optical incident and emergent points at each stage can be achieved, and all the measurements of a single mode optical fiber the propagation mode of which should be limited by bending can be performed. The detailed description of the measurement items will be omitted.

In the above-described embodiments of the invention, the large radius of curvature and the small radius of curvature are set to 140 mm and 30 mm, respectively, according to the advice of CCITT. However, the invention is not limited thereto or thereby. That is, according to conditions for single mode optical fiber characteristic measurement, the large radius of curvature maybe in a range of from 100 mm to 200 mm, while the small radius of curvature may be in a range of from 25 mm to 50 mm.

As is apparent from the above description, in the single mode optical fiber characteristic measuring device according to the invention, at the set stage an optical fiber under measurement is readily set on the carrier in such a manner that it is maintained bent as required. And merely by circulating the carrier through the measuring stages in succession, the geometrical structural parameters such as outside diameter, core diameter, core eccentricity and non-circularity, the spot size, the cutoff wavelength, and the specific refraction difference of the optical fiber can be efficiently, automatically and continuously measured with high accuracy.

In the case where the geometrically large radius of curvature is given to the optical fiber under measurement on the carrier, the optical fiber is bent so that the bend corresponds to one circumference of the circle having the large radius of curvature, and in the case where the small radius of curvature is given to the optical fiber, the latter is bent so that the bend corresponds to more than one circumference of the circle having the small radius of curvature. In bending the optical fiber which has been held straight, the optical fiber is never twisted or slackened. Once the optical fiber is set on the carrier, the tensile force or posture given to the optical fiber is maintained unchanged during measurement.

Therefore, the measurement can be achieved with high accuracy, and the efficiency of measurement is improved.

What is claimed is:

1. A single mode optical fiber characteristic measuring device comprising:
    a set stage for setting an optical fiber under measurement on a carrier and
    measuring stages for measuring characteristics of said optical fiber on said carrier arranged successively in the direction of movement of said carrier, each measuring stage having optical measuring systems incident and emergent ends, said carrier on which said optical fiber under measurement being adapted to be moved to said measuring stages successively, and at each of said measuring stages the two ends of said optical fiber under measurement being aligned with said optical measuring system incident and emergent ends, respectively, so that a characteristic measurement assigned to said stage is performed,
    holders for holding the two ends of an optical fiber under measurement, and a first optical fiber bending unit adapted to accurately bend said optical fiber with a first radius of curvature in such a manner that the bend corresponds to one circumference of a circle having said first radius of curvature, to control the propagation mode in said optical fiber being provided on said carrier, and
    a second optical fiber bending unit adapted to bend said optical fiber under measurement with a second radius of curvature smaller than said first radius of curvature in such a manner that the bend corresponds to more than one circumference of the circle having said second radius of curvature is provided on said carrier or at a predetermined measuring stage or stages.

2. A single mode optical fiber characteristic measuring device according to claim 1 wherein
    said first optical fiber bending unit comprises first and second large-radius-of-curvature bending members, each being adapted to bend said optical fiber under measurement with the large radius of curvature in such a manner that the bend corresponds to a half of the circumference of the circle having said radius of curvature, and
    at least said first large-radius-of-curvature bending members is slidable along the common tangent line of said two large-radius-of-curvature bending members.

3. A single mode optical fiber characteristic measuring device according to claim 2 wherein at least said first large-radius-of-curvature bending member is in the form of a cylinder and is rotatable around the central axis thereof.

4. A single mode optical fiber characteristic measuring device according to claim 2 wherein in order to bend said optical fiber under measurement in the form of the character "S", said large-radius-of-curvature bending members are so arranged as to have only one common tangent line.

5. A single mode optical fiber characteristic measuring device according to claim 3 wherein in order to bend said optical fiber under measurement in the form of the character "S", said large-radius-of-curvature bending members are so arranged as to have only one common tangent line.

6. A single mode optical fiber characteristic measuring device according to claim 2 wherein said large-radius-of-curvature bending members are arranged in such a manner that said bending members has two parallel common tangent lines, and lines tangent to the points where bending of said optical fiber under measurement is started are in collinearity, whereby said optical fiber is bent in the form of a loop.

7. A single mode optical fiber characteristic measuring device according to claim 3 wherein said large-radius-of-curvature bending members are arranged in such a manner that said bending members has two parallel common tangent lines, and lines tangent to the points where bending of said optical fiber under measurement is started are in collinearity, whereby said optical fiber is bent in the form of a loop.

8. A single mode optical fiber characteristic measuring device according to claim 6 said second large-radius-of-curvature bending member is a crescent-shaped member whose recess faces said first large-radius-of-curvature bending member, and said recess is an arc whose radius of curvature is equal to that of said first large-radius-of-curvature bending member.

9. A single mode optical fiber characteristic measuring device according to claim 8, wherein said second large-radius-of-curvature bending member is a crescent-shaped member whose recess faces said first large-radius-of-curvature bending member, and said recess is an arc whose radius of curvature is equal to that of said first large-radius-of-curvature bending member.

10. A single mode optical fiber characteristic measuring device according to claim 2 wherein said first large-radius-of-curvature bending member of said first optical fiber bending unit is provided with a tensile force applying device which, in bending said optical fiber under measurement, applies a force of displacement to said first large-radius-of-curvature bending member in such a manner the force of displacement is directed along said tangent line and towards the side of said first large-radius-of-curvature bending member on which said optical fiber is wound.

11. A single mode optical fiber characteristic measuring device according to claim 3 wherein said first large-radius-of-curvature bending member of said first optical fiber bending unit is provided with a tensile force applying device which, in bending said optical fiber under measurement, applies a force of displacement to said first large-radius-of-curvature bending member in such a manner the force of displacement is directed along said tangent line and towards the side of said first large-radius-of-curvature bending member on which said optical fiber is wound.

12. A single mode optical fiber characteristic measuring device according to claim 4 wherein said first large-radius-of-curvature bending member of said first optical fiber bending unit is provided with a tensile force applying device which, in bending said optical fiber under measurement, applies a force of displacement to said first large-radius-of-curvature bending member in such a manner the force of displacement is directed along said tangent line and towards the side of said first large-radius-of-curvature bending member on which said optical fiber is wound.

13. A single mode optical fiber characteristic measuring device according to claim 6 wherein said first large-radius-of-curvature bending member of said first optical fiber bending unit is provided with a tensile force applying device which, in bending said optical fiber under measurement, applies a force of displacement to said first large-radius-of-curvature bending member in such a manner the force of displacement is directed along said tangent line and towards the side of said first large-radius-of-curvature bending member on which said optical fiber is wound.

14. A single mode optical fiber characteristic measuring device according to claim 8 wherein said first large-radius-of-curvature bending member of said first optical fiber bending unit is provided with a tensile force applying device which, in bending said optical fiber under measurement, applies a force of displacement to said first large-radius-of-curvature bending member in such a manner the force of displacement is directed along said tangent line and towards the side of said first large-radius-of-curvature bending member on which said optical fiber is wound.

15. A single mode optical fiber characteristic measuring device according to claim 10 wherein said tensile force applying device comprises a thin leaf spring which is spirally wound and has one end connected to said first large-radius-of-curvature bending member in said first optical fiber bending unit and the other end connected to a drum which is rotatable around a rotating shaft which is spaced, in the direction of said tangent line, from the side of said first large-radius-of-curvature bending member on which said optical fiber is wound, and said tensile force applying device applies a predetermined tensile force of said optical fiber irrespective of the amount of drawing of said thin leaf spring.

16. A single mode optical fiber characteristic measuring device according to claim 1 wherein
said second optical fiber bending unit being adapted to give the small radius of curvature to said optical fiber under measurement comprises at least three small-radius-of-curvature bending members having an arcuate surface of said small radius of curvature,
at least two of said small-radius-of-curvature bending members, namely, first small-radius-of-curvature bending members are arranged in such a manner that said first small-radius-of-curvature bending members are provided on one side of said optical fiber under measurement and are spaced from each other by a distance which is two times said small-radius-of-curvature, and are in contact with said optical fiber under measurement so that, when said first optical fiber bending unit bends said optical fiber under measurement with the large radius of curvature, said optical fiber is not bent by said first small-radius-of-curvature bending members,
the remaining small-radius-of-curvature bending members, namely, a second small-radius-of-curvature bending member takes, when only the large radius of curvature is given to said optical fiber under measurement by said first optical fiber bending unit, a first position which is located on the other side of said optical fiber under measurement so that said optical fiber under measurement is not bent by said second small-radius-of-curvature bending member, and takes, when the small-radius-of-curvature is given to said optical fiber under measurement, a second position here said second small-radius-to-curvature bending member is located between said first small-radius-of-curvature bending members,
when said second small-radius-of-curvature bending member is at said second position, each of said first small-radius-of-curvature bending members bends said optical fiber under measurement in such a manner that the bend corresponds to a quarter (¼) of the circumference of the circle whose radius is equal to said small radius of curvature, while said second small-radius-of-curvature bending member bends said optical fiber under measurement in such a manner that the bend corresponds to a half (½) of the circumference of the circle whose radius is equal to said radius of curvature, and owing to said second optical fiber bending unit, a minimum radius of curvature given to said optical fiber is equal to said small radius of curvature.

17. A single mode optical fiber characteristic measuring device according to claim 3 wherein said second optical fiber bending unit adapted to give the small radius of curvature to said optical fiber under measurement comprises at least three small-radius-of-curvature bending members having an arcuate surface of said small radius of curvature, at least two of said small-radius-of-curvature bending members, namely, first small-radius-of-curvature bending members are arranged in such a manner that said first small-radius-of-curvature bending members are provided on one side of said optical fiber under measurement and are spaced from each other by a distance which is two times said small radius of curvature, and are in contact with said optical fiber under measurement so that, when said first optical fiber bending unit bends said optical fiber under measurement with the large radius of curvature, said optical fiber is not bent by said first small-radius-of-curvature bending members, the remaining small-radius-of-curvature bending members, namely, a second small-radius-of-curvature bending member takes, when only the large radius of curvature is given to said optical fiber under measurement by said first optical fiber bending unit, a first position which is located on the other side of said optical fiber under measurement so that said optical fiber under measurement is not bent by said second small-radius-of-curvature bending member, and takes, when the small-radius-of-curvature is given to said optical fiber under measurement, a second position here said second small-radius-to-curvature bending member is located between said first small-radius-of-curvature bending members, when said second small-radius-of-curvature bending member is at said second position, each of said first small-radius-of-curvature bending members bends said optical fiber under measurement in such a manner that the bend corresponds to a quarter (¼) of the circumference of the circle whose radius is equal to said small radius of curvature, while said second small-radius-of-curvature bending member bends said optical fiber under measurement in such a manner that the bend corresponds to a half (½) of the circumference of the circle whose radius is equal to said radius of curvature, and owing to said second optical fiber bending unit, a minimum radius of curvature given to said optical fiber is equal to said small radius of curvature.

18. A single mode optical fiber characteristic measuring device according to claim 4 wherein said second optical fiber bending unit adapted to give the small radius of curvature to said optical fiber under measurement comprises at least three small-radius-of-curvature bending members having an arcuate surface of said small radius of curvature, at least two of said small-radius-of-curvature bending members, namely, first small-radius-of-curvature bending members are arranged in such a manner that said first small-radius-of-curvature bending members are provided on one side of said optical fiber under measurement and are spaced from each other by a distance which is two times said small radius of curvature, and are in contact with said optical fiber under measurement so that, when said first optical fiber bending unit bends said optical fiber under measurement with the large radius of curvature, said optical fiber is not bent by said first small-radius-of-curvature bending members, the remaining small-radius-of-curvature bending members, namely, a second small-radius-of-curvature bending member takes, when only the large radius of curvature is given to said optical fiber under measurement by said first optical fiber bending unit, a first position which is located on the other side of said optical fiber under measurement so that said optical fiber under measurement is not bent by said second small-radius-of-curvature bending member, and takes, when the small radius of curvature is given to said optical fiber under measurement, a second position here said second small-radius-to-curvature bending member is located between said first small-radius-of-curvature bending members, when said second small-radius-of-curvature bending member is at said second position, each of said first small-radius-of-curvature bending members bends said optical fiber under measurement in such a manner that the bend corresponds to a quarter (¼) of the circumference of the circle whose radius is equal to said small radius of curvature, while said second small-radius-of-curvature bending member bends said optical fiber under measurement in such a manner that the bend corresponds to a half (½) of the circumference of the circle whose radius is equal to said radius of curvature, and owing to said second optical fiber bending unit, a minimum radius of curvature given to said optical fiber is equal to said small radius of curvature.

19. A single mode optical fiber characteristic measuring device according to claim 6 wherein said second optical fiber bending unit adapted to give the small radius of curvature to said optical fiber under measurement comprises at least three small-radius-of-curvature bending members having an arcuate surface of said small radius of curvature, at least two of said small-radius-of-curvature bending members, namely, first small-radius-of-curvature bending members are arranged in such a manner that said first small-radius-of-curvature bending members are provided on one side of said optical fiber under measurement and are spaced from each other by a distance which is two times said small radius of curvature, and are in contact with said optical fiber under measurement so that, when said first optical fiber bending unit bends said optical fiber under measurement with the large radius of curvature, said optical fiber is not bent by said first small-radius-of-curvature bending members, the remaining small-radius-of-curvature bending members, namely, a second small-radius-of-curvature bending member takes, when only the large radius of curvature is given to said optical fiber under measurement by said first optical fiber bending unit, a first position which is located on the other side of said optical fiber under measurement so that said optical fiber under measurement is not bent by said second small-radius-of-curvature bending member, and takes, when the small radius of curvature is given to said optical fiber under measurement, a second position where said second small-radius-to-curvature bending member is located between said first small-radius-of-curvature bending members, when said second small-radius-of-curvature bending member is at said second position, each of said first small-radius-of-curvature bending members bends said optical fiber under measurement in such a manner that the bend corresponds to a quarter ($\frac{1}{4}$) of the circumference of the circle whose radius is equal to said small radius of curvature, while said second small-radius-of-curvature bending member bends said optical fiber under measurement in such a manner that the bend corresponds to a half ($\frac{1}{2}$) of the circumference of the circle whose radius is equal to said radius of curvature, and owing to said second optical fiber bending unit, a minimum radius of curvature given to said optical fiber is equal to said small radius of curvature.

20. A single mode optical fiber characteristic measuring device according to claim 8 wherein said second optical fiber bending unit adapted to give the small radius-of-curvature to said optical fiber under measurement comprises at least three small radius-of-curvature bending members having an arcuate surface of said small radius-of-curvature, at least two of said small radius-of-curvature bending members, namely, first small radius-of-curvature bending members are arranged in such a manner that said first small radius-of-curvature bending members are provided on one side of said optical fiber under measurement and are spaced from each other by a distance which is two times said small radius-of-curvature, and are in contact with said optical fiber under measurement so that, when said first optical fiber bending unit bends said optical fiber under measurement with the large radius-of-curvature, said optical fiber is not bent by said first small radius-of-curvature bending members, the remaining small radius-of-curvature bending members, namely, a second small radius-of-curvature bending member takes, when only the large radius-of-curvature is given to said optical fiber under measurement by said first optical fiber bending unit, a first position which is located on the other side of said optical fiber under measurement so that said optical fiber under measurement is not bent by said second small radius-of-curvature bending member, and takes, when the small radius-of-curvature is given to said optical fiber under measurement, a second position where said second small radius-of-curvature bending member is located between said first small radius-of-curvature bending members, when said second small radius-of-curvature bending member is at said second position, each of said first small radius-of-curvature bending members bends said optical fiber under measurement in such a manner that the bend corresponds to a quarter ($\frac{1}{4}$) of the circumference of the circle whose radius is equal to said small radius-of-curvature, while said second small radius-of-curvature bending member bends said optical fiber under measurement in such a manner that the bend corresponds to a half ($\frac{1}{2}$) of the circumference of the circle whose radius is equal to said radius-of-curvature, and owing to said second optical fiber bending unit, a minimum radius-of-curvature given to said optical fiber is equal to said small radius-of-curvature.

21. A single mode optical fiber characteristic measuring device according to claim 10 wherein said second optical fiber bending unit adapted to give the small radius of curvature to said optical fiber under measurement comprises at least three small-radius-of-curvature bending members having an arcuate surface of said small radius of curvature, at least two of said small-radius-of-curvature bending members, namely, first small-radius-of-curvature bending members are arranged in such a manner that said first small-radius-of-curvature bending members are provided on one side of said optical fiber under measurement and are spaced from each other by a distance which is two times said small radius of curvature, and are in contact with said optical fiber under measurement so that, when said first optical fiber bending unit bends said optical fiber under measurement with the large radius of curvature, said optical fiber is not bent by said first small-radius-of-curvature bending members, the remaining small-radius-of-curvature bending members, namely, a second small-radius-of-curvature bending member takes, when only the large radius of curvature is given to said optical fiber under measurement by said first optical fiber bending unit, a first position which is located on the other side of said optical fiber under measurement so that said optical fiber under measurement is not bent by said second small-radius-of-curvature bending member, and takes, when the small radius of curvature is given to said optical fiber under measurement, a second position where said second small-radius-to-curvature bending member is located between said first small-radius-of-curvature bending members, when said second small-radius-of-curvature bending member is at said second position, each of said first small-radius-of-curvature bending members bends said optical fiber under measurement in such a manner that the bend corresponds to a quarter ($\frac{1}{4}$) of the circumference of the circle whose radius is equal to said small radius of curvature, while said second small-radius-of-curvature bending member bends said optical fiber under measurement in such a manner that the bend corresponds to a half ($\frac{1}{2}$) of the circumference of the circle whose radius is equal to said radius of curvature, and owing to said second optical fiber bending unit, a minimum radius of curvature given to said optical fiber is equal to said small radius of curvature.

22. A single mode optical fiber characteristic measuring device according to claim 15 wherein said second optical fiber bending unit adapted to give the small radius of curvature to said optical fiber under measurement comprises at least three small-radius-of-curvature bending members having an arcuate surface of said small radius of curvature, at least two of said small-radius-of-curvature bending members, namely, first small-radius-of-curvature bending members are arranged in such a manner that said first small-radius-of-curvature bending members are provided on one side of said optical fiber under measurement and are spaced from each other by a distance which is two times said small radius of curvature, and are in contact with said optical fiber under measurement so that, when said first optical fiber bending unit bends said optical fiber under measurement with the large radius of curvature, said optical fiber is not bent by said first small-radius-of-curvature bending members, the remaining small-radius-of-curvature bending members, namely, a second small-radius-of-curvature bending member takes, when only the large radius of curvature is given to said optical fiber under measurement by said first optical fiber bending unit, a first position which is located on the other side of said optical fiber under measurement so that said optical fiber under measurement is not bent by said second small-radius-of-curvature bending member, and takes, when the small radius of curvature is given to said optical fiber under measurement, a second position where said second small-radius-to-curvature bending member is located between said first small-radius-of-curvature bending members, when said second small-radius-of-curvature bending member is at said second position, each of said first small-radius-of-curvature bending members bends said optical fiber under measurement in such a manner that the bend corresponds to a quarter ($\frac{1}{4}$) of the circumference of the circle whose radius is equal to said small radius of curvature, while said second small-radius-of-curvature bending member bends said optical fiber under measurement in such a manner that the bend corresponds to a half ($\frac{1}{2}$) of the circumference of the circle whose radius is equal to said radius of curvature, and owing to said second optical fiber bending unit, a minimum radius of curvature given to said optical fiber is equal to said small radius of curvature.

23. A single mode optical fiber characteristic measuring device according to claim 16 wherein said second small-radius-of-curvature bending member in said second optical fiber bending unit is smoothly rotatable around a cylindrical shaft.

24. A single mode optical fiber characteristic measuring device according to claim 1 wherein at least one of said measuring stages, said optical measuring system incident and emergent ends are of optical fibers held by holders, respectively, with which the positions of said optical measuring system incident and emergent ends can be finely adjusted so that, when said measuring system incident and emergent ends are connected to both ends of said optical fiber under measurement, the power of light emitted from the emergent end is maximum.

* * * * *